UNITED STATES PATENT OFFICE

CARL KRAUCH AND MARTIN MÜLLER-CUNRADI, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

UNSATURATED ALIPHATIC HYDROCARBON

No Drawing. Application filed July 18, 1927, Serial No. 206,782, and in Germany July 28, 1926.

We have found that valuable unsaturated aliphatic hydrocarbons can be obtained by treating, at elevated temperatures, hydrocarbons or mixtures of hydrocarbons of low or medium boiling point or range of boiling points (that is not more than about 300° C. and preferably below 200° C.) having a greater number of hydrogen atoms or carbon atoms or both in the molecule than the reaction products, such as benzine, with active porous substances, such as active charcoals, active silica and the like.

When working with charcoal, the most varied kinds thereof may be used, for example, wood charcoal prepared with the aid of zinc chlorid, brown-coal coke activated with steam, active charcoal prepared from lignite rich in humus, and the like. The charcoals may be impregnated with other substances, as for example metals or their oxides or salts. A favorable action is also obtained by such active masses as are composed of, or prepared from, compounds of metals with suitable organic substances, for example iron humate or zinc humate. As a rule, the formation of the unsaturated hydrocarbons is the result of the separation of hydrogen, but it may sometimes also occur by hydrocarbon groups being split off. In the latter case, higher temperatures usually have to be employed. Both singly and multiply unsaturated hydrocarbons can be produced by this process, operating in several stages being often advisable when hydrocarbons of the latter class are to be produced. Other gases or vapors may be passed over the contact masses concurrently with the hydrocarbons under treatment, and the operation may be conducted under atmospheric, diminished or increased pressure.

The process is particularly applicable to the lower and middle members of the various aliphatic and hydroaromatic hydrocarbons, that is to say those boiling up to 200° C. and those boiling from 200° to 300° C., especially such as are obtained by destructive hydrogenation of coal, carbonaceous substances and mineral oils, as well as from the extraction, distillation, transformation and the like products of same. When hydroaromatic hydrocarbons are employed, the temperature should be sufficiently high to ensure the preponderating formation of aliphatic olefines over the dehydrogenation to aromatic hydrocarbons.

The resulting olefines, especially the multiply unsaturated hydrocarbons, may be polymerized into products similar to rubber. The olefines and especially the simply-unsaturated olefines, may also be made to furnish additive products with other elements and compounds, such as halogens, halogen hydrides, hypo-halogenous acids, water, and the like.

The following example will further illustrate how the invention may be carried out in practice, but the invention is not restricted thereto.

Example

The vapor of pentane is passed, at about from 450° to 500° C., over active charcoal prepared by treating brown-coal coke with steam at from 800° to 900° C. The product, liquefied by intensive cooling, contains, apart from pentane, large quantities of amylene together with comparatively small amounts of other decomposition products.

What we claim is:

1. The process of producing amylene which comprises treating pentane at between about 450° and 500° C. with active charcoal.

2. In the production of olefines by heat treatment of normally liquid hydrocarbons containing substantially no constituents boiling above about 300° C. and consisting of hydrocarbons containing a greater number of hydrogen atoms in the molecule than the reaction products, the step of treating the said initial materials at temperatures ranging from 450 to 500° C. with an active, porous substance selected from the group consisting of active charcoals and active silica.

3. In the production of olefines by heat treatment of normally liquid hydrocarbons containing substantially no constituents boiling above about 300° C. and consisting of hydrocarbons containing a greater number of hydrogen atoms in the molecule than the reaction products, the step of treating said initial materials at temperatures ranging from 450 to 500° C. with active charcoal.

4. In the production of olefines by heat treatment of normally liquid products of destructive hydrogenation of carbonaceous materials containing substantially no constituents boiling above about 300° C. and consisting of hydrocarbons containing a greater number of hydrogen atoms in the molecule than the reaction products, the step of treating the said initial materials at temperatures ranging from 450 to 500° C. with an active, porous substance selected from the group consisting of active charcoals and active silica.

5. In the production of olefines by heat treatment of the normally liquid products of destructive hydrogenation of carbonaceous materials containing substantially no constituents boiling above about 200° C. and consisting of hydrocarbons containing a greater number of hydrogen atoms in the molecule than the reaction products, the step of treating the said initial materials at temperatures ranging from 450 to 500° C. with an active, porous substance selected from the group consisting of active charcoals and active silica.

6. In the production of olefines by heat treatment of normally liquid aliphatic hydrocarbons containing substantially no constituents boiling above about 300° C. and consisting of hydrocarbons containing a greater number of hydrogen atoms in the molecule than the reaction products, the step of treating the said initial materials with active charcoal at temperatures ranging from 450 to 500° C.

7. In the production of olefines by heat treatment of normally liquid aliphatic hydrocarbons containing substantially no constituents boiling above about 300° C. and consisting of hydrocarbons which, as compared with the reaction products, contain a greater number of hydrogen atoms and the same number of carbon atoms in the molecule, the step of treating the said initial material with an active, porous substance selected from the group consisting of active charcoals and active silica at temperatures ranging from 450 to 500° C.

8. In the production of olefines by the heat treatment of normally liquid aliphatic hydrocarbons containing substantially no constituents boiling above about 300° C. and consisting of hydrocarbons which, as compared with the reaction products, contain a greater number of hydrogen atoms and the same number of carbon atoms in the molecule, the step of treating the said initial materials with active charcoal at temperatures ranging from 450 to 500° C.

In testimony whereof we have hereunto set our hands.

CARL KRAUCH.
MARTIN MÜLLER-CUNRADI.